April 1, 1952 S. H. COHEN ET AL 2,591,337
BRACKET FOR AUTOMOBILE SIGNS
Filed Dec. 14, 1949
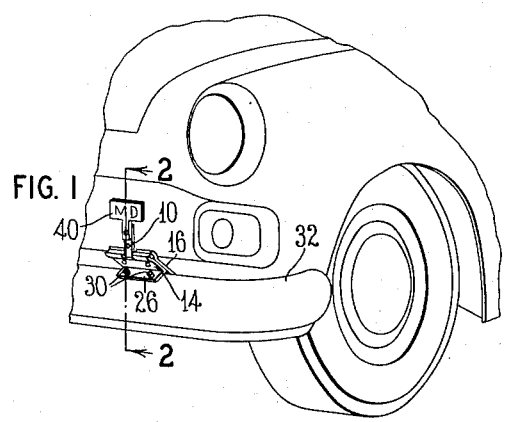
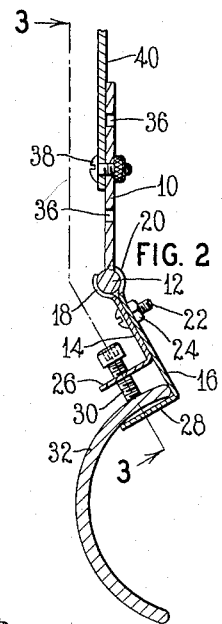
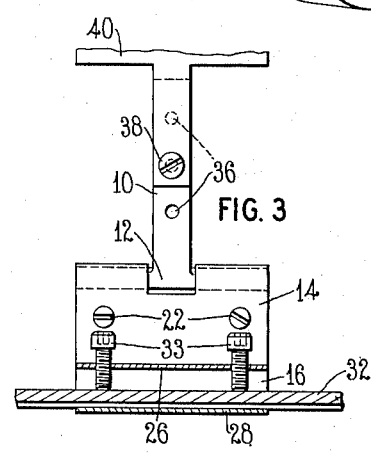
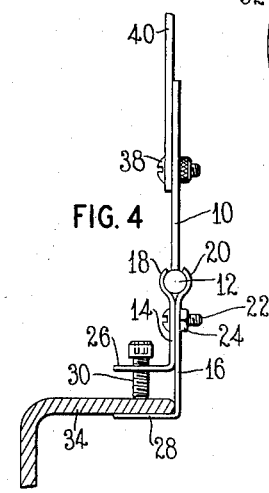
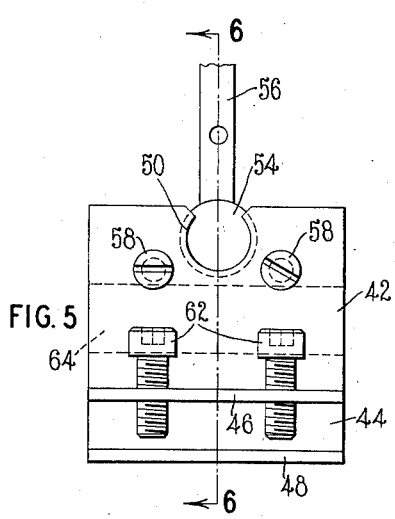
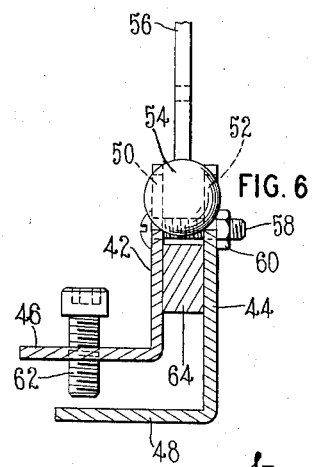
INVENTORS
SAMUEL H. COHEN
EUGENE PILTCH
by Wright, Brown,
Quinby & May
ATT'YS Patented Apr. 1, 1952

2,591,337

UNITED STATES PATENT OFFICE 2,591,337

BRACKET FOR AUTOMOBILE SIGNS

Samuel H. Cohen, Brookline, and Eugene Piltch, Cambridge, Mass.

Application December 14, 1949, Serial No. 132,940

3 Claims. (Cl. 248—226)

This invention relates to an adjustable bracket adapted to be attached to the front or rear bumper of an automobile and to support in an upright position, a registration plate, emblem or other object which the owner may wish to display.

The bumpers supplied with the various makes of automobiles on the market vary widely in cross-sectional shape, most of such shapes being arcuate or some form of channel. According to the present invention, a bracket is provided which includes a clamp adapted to be secured to the margin of a bumper of any shape. A stem is pivotally connected to the clamp and is arranged to be secured at any angle thereto so that when the clamp has been secured to a bumper, the stem can be adjusted to a vertical position or, if desired, to any degree of inclination for the display of a plate or emblem to be attached thereto.

For a more complete understanding of the invention, reference may be had to the following description thereof, and to the drawing, of which—

Figure 1 is a perspective view of a portion of an automobile having an embodiment of the invention mounted on the bumper;

Figure 2 is a section, on a larger scale, taken on the line 2—2 of Figure 1;

Figure 3 is a section on the line 3—3 of Figure 2;

Figure 4 is an edgewise elevational view of the bracket shown in Figure 1, the bracket being mounted on a bumper of another shape.

Figure 5 is a front elevation of a modified form of the invention; and

Figure 6 is a section on the line 6—6 of Figure 5.

The bracket embodying the invention comprises essentially a stem 10 having a lower end which is adjustably gripped by a clamp which also grips the bumper of an automobile or other supporting object, the angular relation between the stem and clamp being adjustable so that the stem can be secured in a vertical position regardless of the angular position of the clamp. This is important as the clamp may have different angular positions when mounted on different kinds of bumpers, as illustrated in Figures 3 and 4, for example.

In the form of the invention shown in Figures 1-4, the stem 10 has a transverse, cylindrical base portion 12 which is gripped by the upper portion of the bracket. The bracket may conveniently be made of two rigid plates 14 and 16 which are substantially parallel when in use. The upper portions of these plates are oppositely grooved, as at 18 and 20, to receive the base portion 12 of the stem. The cylindrical base portion 12 can turn between the plates, when loosely held, so that the angular relation of the stem to the plates can be adjusted. Through fastening means, such as bolts 22 and nuts 24 extend through the plates 14 and 16 and can be used to draw the plates together so as to grip the base 12 of the stem tightly and hold it in adjusted relation.

The plates 14 and 16 each have a flange, 26 and 28 respectively, along its lower edge, these flanges being spaced and parallel to each other. Two or more set screws 30 are threaded through one of these flanges to project toward the other. A portion of a bumper 32 is received between the set screws and the opposite flange, and the screws are set up to grip the bumper and hold the bracket in fixed position thereon. If the bumper 32 has an arcuate cross-section like the one shown in Figure 2 the plates 14 and 16 will generally have an inclined position, but the articulated joint between the plates and the stem permits the latter to be clamped in a vertical position, as shown. A bumper 34 having a different cross-sectional shape is indicated in Figure 4.

The stem 10 is preferably a flat strip having holes 36 or slots therethrough for bolts 38 or the like by which a registration plate or emblem 40 can be secured to the stem.

A modified form of the invention is shown in Figures 5 and 6. In this form, the clamping means comprises two parallel plates 42 and 44 with parallel, spaced flanges 46 and 48. The plates have opposed holes 50 and 52 near their upper edges to receive between them a ball portion 54 at the lower end of the stem 56, the ball being seated in both holes. The plates are drawn together to grip the ball by bolts 58 and nuts 60, or other equivalent means, so that the stem is clamped in any angular position relative to the bracket. The flange 46 is provided with set screws 62 which project toward the flange 48 to clamp a supporting element such as an automobile bumper. A spacer block 64 is preferably attached to one of the plates to provide a fulcrum for the clamping action of the upper portions of the plates.

We claim:

1. A bracket attachable to an automobile bumper, comprising two rigid plates substantially parallel to each other, each said plate having a flange along the lower edge thereof, a stem having a lower portion between the upper portions of said plates, said portions of the stem and plates being shaped to form an articulated joint, means for drawing said plates together to grip said stem in adjusted angular relation to the plates, and for maintaining said flanges in spaced parallel relation, and set screws threaded through one said flange to project toward the other.

2. A bracket attachable to an automobile bumper, comprising two rigid plates each having a flange along its lower edge, a stem having a cylindrical base extending transversely thereof, the upper portions of said plates being formed with opposing grooves to receive said base and form an articulated joint therewith, a plurality of fastening members extending through said plates and operable to draw the plates together to grip said base and maintain the stem in adjusted angular position relative to the plates, and set screws threaded through one of said flanges and projecting toward the other whereby a supporting object can be clamped between said screws and said other flange.

3. A bracket attachable to an automobile bumper, comprising two rigid plates each having a flange along its lower edge and a circular hole near its upper edge, said flanges being parallel and spaced apart, said holes being opposite each other, a stem having a ball at its lower end engaged between said plates and seated in said holes, fastening means through said plates operable to draw said plates together to clamp said ball tightly whereby to hold the stem in adjusted angular relation to said plates, and set screws threaded through one said flange and projecting toward the other to clamp a supporting object between them and said other flange.

SAMUEL H. COHEN.
EUGENE PILTCH.

REFERENCES CITED

The following references are of record in the file of this patent:

UNITED STATES PATENTS

| Number | Name | Date |
|---|---|---|
| 972,480 | Southwick | Oct. 11, 1910 |
| 1,679,715 | Fish | Aug. 7, 1928 |